United States Patent [19]

Wojick

[11] 4,308,701
[45] Jan. 5, 1982

[54] SAFETY DOWEL GUARD AND METHOD OF USE

[76] Inventor: Victor E. Wojick, 14449 Harrison, Livonia, Mich. 48154

[21] Appl. No.: 148,456

[22] Filed: May 9, 1980

[51] Int. Cl.³ .............................................. E04N 12/48
[52] U.S. Cl. ...................................... 52/244; 52/741; 52/DIG. 12
[58] Field of Search ................. 52/741, DIG. 12, 263, 52/244, 301

[56] References Cited

U.S. PATENT DOCUMENTS

| 2,450,345 | 9/1948 | Kervin | 52/301 |
| 2,664,977 | 1/1954 | Starcevich | 52/301 |
| 4,229,919 | 10/1980 | Hughes | 52/263 |

Primary Examiner—Price C. Faw, Jr.
Assistant Examiner—Carl D. Friedman
Attorney, Agent, or Firm—Cullen, Sloman, Cantor, Grauer, Scott & Rutherford

[57] ABSTRACT

In the pouring of concrete for building floors and walls having steel reinforcements over an area to be poured and a series of parallel spaced rows of longitudinally spaced upright dowel bars extending over the area, the method of protecting workers from impalement and injury due to a fall onto the bars consists of providing a series of downwardly facing dowel guard channels having depending support pipes and selectively positioning channels over a series of dowel bars in each row and assemblying the respective pipes over and upon the dowel bars of each row, the rows of channels being co-planer for forming a protective cover over the dowel bars. The safety dowel guard includes a downwardly facing channel and a series of longitudinally spaced support pipes within each channel, at one end secured thereto and with their other ends depending below the channels adapted to telescope over a corresponding series of dowel bars. A fastener secures each pipe to a dowel bar.

13 Claims, 5 Drawing Figures

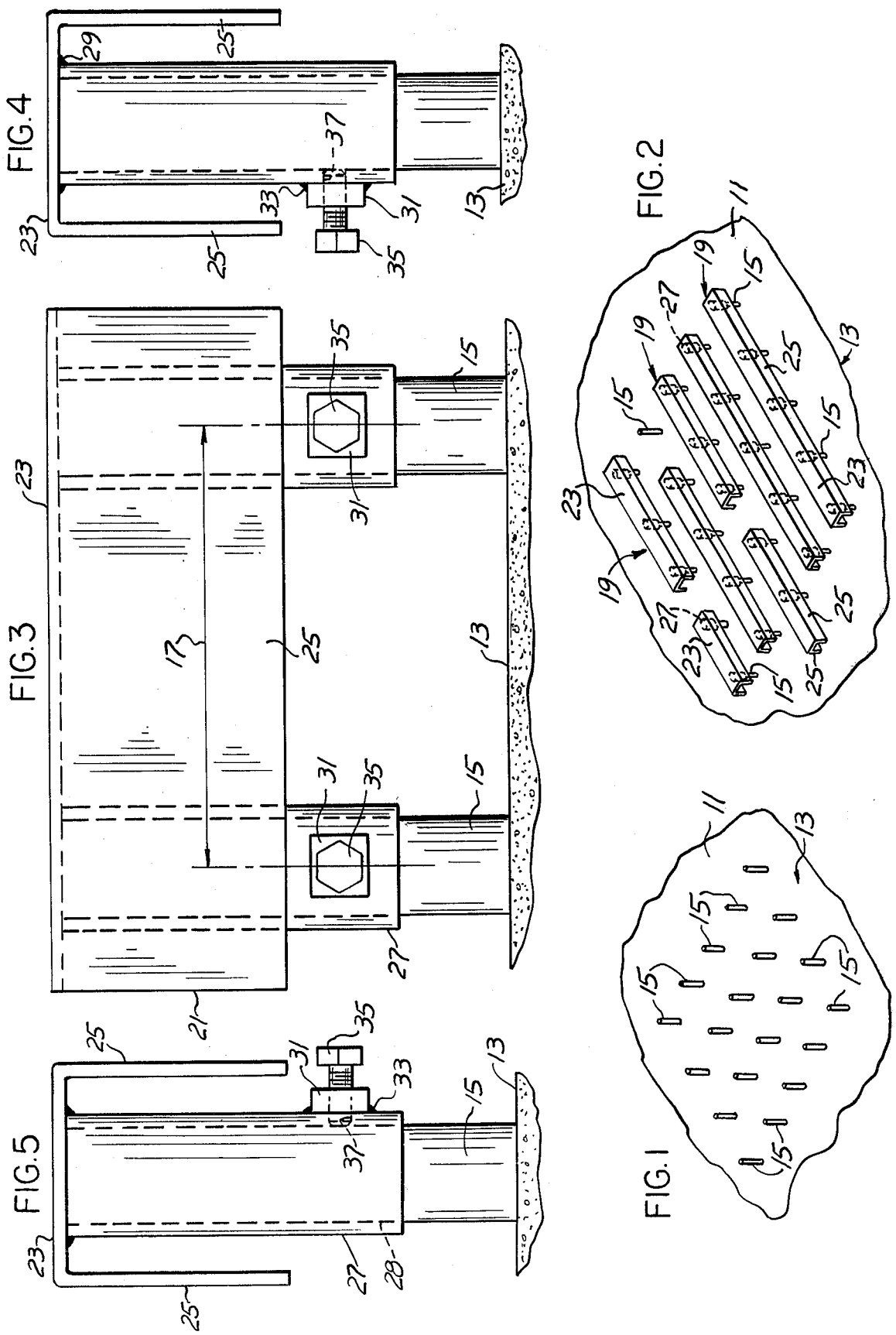

SAFETY DOWEL GUARD AND METHOD OF USE

BACKGROUND OF THE INVENTION

Heretofore there has existed the problem in connection with the pouring of concrete for building floors and walls having steel reinforcements over an area to be poured and a series of spaced rows of longitudinally spaced upright dowel bars extending over the area, and wherein in the past workers and others have fallen accidently onto the dowel bars and have been impaled or otherwise injured thereby.

SUMMARY OF THE INVENTION

A feature of the present invention is to provide a method of protecting workers from impalement and injury due to falling onto such dowel bars and which consists of providing a series of downwardly facing dowel guard channels having depending support pipes and selectively positioning the channels over a series of said dowel bars in each row and assemblying the respective pipes on and upon the dowel bars of each row of dowel bars protectively enclosing them.

A further feature is to arrange the channels so that their top surfaces are co-planer to form a protective cover over the dowel bars so that if a worker falls, he at least falls upon a substantially flat surface, minimizing his injury.

A further feature of the present method includes the forming of a series of dowel guard channels of variable lengths, and wherein each channel has a plurality of depending longitudinally spaced channel support pipes having an ID greater than the diameter of the respective dowel bars wherein the support pipes of the respective channels are selectively positioned and telescoped over a corresponding series of similarly spaced dowel bars and are secured thereto.

A further feature of the present invention includes construction of a plurality of dowel guards in varying lengths and which include elongated downwardly opening channel into which are placed a series of longitudinally spaced channel support pipes at their upper ends welded to the channel and with their lower ends depending below the channel adapted for telescoping registry with the corresponding spaced underlying dowel bars so as to protectively enclose a plurality thereof. A plurality of the protective dowel guards are employed over an area which consists of a series of rows of such spaced dowel bars, and wherein channels of varying lengths depending upon requirements overlie all of the dowel bars of the respective parallel rows. The tops of the channels are arranged coplaner and provide a substantially flat floor surface to protectively separate a worker who has fallen from the respective dowel bars.

These and other features will be seen in the following specification and claims in conjunction with the appended drawing.

THE DRAWING

FIG. 1 is a fragmentary perspective view of a floor or wall area of a building showing a steel reinforcement and a series of rows of longitudinally spaced dowel bars adapted to provide reinforcement for concrete to be poured thereon.

FIG. 2 is fragmentary perspective view similar to FIG. 1 showing a series of longitudinally spaced dowel guard channels arranged in parallel spaced relation over a series of rows of longitudinally spaced dowel bars co-extensive with an area of a building construction.

FIG. 3 is a side elevational view with a single dowel guard of minimum length having a pair of depending support pipes secured thereto, and shown telescoped over a corresponding pair of upstanding dowel bars.

FIG. 4 is a right side elevational view of the safety dowel guard.

FIG. 5 is a left side elevational view of the safety dowel guard as assembled in FIG. 3.

It will be understood that the above drawing is illustrative of steps of the present method and of the safety dowel guard construction, and that other method steps and constructions are contemplated within the scope of the claims hereafter set forth.

DETAILED DESCRIPTION OF METHOD OF PROTECTING WORKERS FROM IMPALEMENT AND INJURY DUE TO FALLING ONTO DOWEL BARS

Referring to the drawing, a floor of a building or a wall is generally indicated at 11 and which has therein a steel reinforcement 13 normally used for concrete poured onto the area, such as defined in FIG. 1. Such reinforcement includes a series of rows of longitudinally spaced upright steel dowel bars 15 which extend throughout the area. The rows of dowel bars are parallel and spaced apart, such as at spacings of six inches, twelve inches and up to two feet, for example.

As can be seen from FIG. 1, the problem has long existed of the accidental falling of a worker onto the exposed dowel bars resulting in some impalement or other injury to the worker. Thus, the present invention is directed to a method as well as apparatus to provide a protective enclosure for the respective rows of dowel bars to in effect provide a flooring consisting of a series of slats defined by the spaced aligned guard channels so that if the worker does fall, he will be protected by the flooring provided by the series of parallel spaced and longitudinally aligned dowel guards shown in FIG. 2. These dowel guards are removed from the assembly, as shown in FIGS. 2 and 3, before actual pouring of the concrete.

In the illustrative embodiment and in conventional construction, the respective steel upright dowel bars 15 are normally arranged at a center distance 17 usually of two feet, though this can be modified. The plurality of safety dowel guards 19 are arranged and longitudinally spaced in a row, and further arranged in parallel rows such as shown at 19 in FIG. 2. Each dowel guard includes an elongated channel 21 with sides 25.

Within each channel, which may be of varying lengths, as for example four, six, eight, or ten feet, there are arranged a series of longitudinally spaced support pipes 27 whose upper ends are centered between the sides 25 and secured to the under surface of the base 23 as by the welds 29. In the illustrative embodiment, the respective support pipes 27 of which there are two in FIG. 3, have a longitudinal center distance 17 corresponding to the center distance between the upright dowel bars 15. For channels 21, which are less that four feet in length, there are normally applied thereto a pair of depending support pipes 27 adapted for cooperative registry with a corresponding pair of upstanding dowel bars 15. For longer lengths of channels and to encompass and protectively enclose a series of such dowel bars, there are normally arranged a plurality of such support pipes 27, such as 3, 4 or 5, since the lengths of the channels may range between four feet and ten feet. The spacing between the respective support pipes 27 corresponds to the spacing of the respective dowel bars in a particular row, such as shown in FIG. 2.

Each of the support pipes 27 has a longitudinal bore 28 along its length and is adapted to telescopically receive and be positioned over the stationary upstanding and corresponding dowel bar 15.

With the dowel bars being of uniform height, and with the support pipes 27 of uniform length, upon the telescoping of the respective safety guards over the corresponding dowel bars, the dowel bars will project up through the full length of the support pipes and supportably engage the base of channel 21. Each of the respective support pipes 27 adjacent its lower end has a lateral aperture 37 therethrough, FIG. 4. Overlying and centered with respect to such aperture is a nut 31 which bears against a portion of the pipe and is secured thereto, as by the welds 33, FIG. 5.

Threaded bolts 35 extend through the respective nuts, through the pipe apertures 37 are adapted to operatively, frictionally and retainingly engage the corresponding dowel bar. This will anchor the respective protective dowel bar channels onto the dowel bars wherein the tops or bases 23 of the channels are in substantial longitudinal alignment as in FIG. 2. Such arrangement provides a slatted protective flooring, FIG. 2, substantially overlies the series of rows of spaced dowel bars in a particular area protectively enclosing the exposed ends of said dowel bars for protecting a worker who might accidently fall onto the area, limiting his injury to impact of his body with co-planer elements 19 rather than bar ends.

The present method of protecting workers from impalement or injury due to accidental falling onto a series of exposed dowel bars covering the part of an unpoured framework in a building consists of providing a series of such downwardly facing dowel guard channels with each channel having a plurality of depending support pipes having an ID greater than the diameter of the dowel bars.

A further step includes selectively positioning said channels over a series of dowel bars in each row and assembling the respective support pipes over and upon some of said dowel bars of each row of dowel bars. The plurality of such positioned channels are arranged in a series of parallel spaced rows over the area with the channels at the tops thereof being in substantial alignment and longitudinally spaced and the series of assembled channels being co-planer, forming a protective cover over the exposed dowel bars.

The dowel bars of each row of dowel bars are uniformly spaced apart and the support pipes on each channel may be similarly spaced apart.

As shown in the drawing, FIG. 2, the row of protective channels 19 oppose a series of such channels longitudinally spaced and of different lengths as may be needed to protectively cover and enclose corresponding dowel bars. In the illustrative embodiment, the respective channels are formed from steel plate which is six inches wide and which includes a pair of bends so that the base 23 is two inches in width and the respective sides 25 are two inches in height. The channel is constructed of one-eighth inch guage steel and the support pipes 27 have one-eighth inch thickness walls.

The present support pipes 27 are of such internal diameter as to be received over all conventional sizes of dowel bars for assembly thereon in the manner shown in FIG. 2 and secured thereto as by the series of fasteners or bolts 35.

In some cases, the dowel bars are more closely spaced such as at 6 inches, 12 inches and 18 inches. As the pipes 27 may be spaced at two foot intervals, certain intermediate dowel bars may not receive a pipe 27, but nevertheless are covered by the corresponding overlying channel 21. In some cases all of the dowel bars are not enclosed with a pipe but are protectively covered by a channel. It is not necessary that there be a pipe 27 corresponding to each dowel bar, as long as the tops of all of the dowel bars are covered by a channel. For a particular length of channel 21 there may be only a few pipes 27 depending therefrom, i.e. enough to hold each channel over a greater number of dowel bars.

Having described my invention, reference should now be had to the following claims.

I claim:

1. In the pouring of steel reinforced concrete for building floors and walls having steel reinforcements over an area to be poured and a series of parallel spaced rows of longitudinally spaced upright dowel bars extending over said area;

the method of protecting workers from impalement and injury due to falling onto said bars consisting of providing a series of downwardly facing dowel guard channels having longitudinally depending support pipes with an ID greater than said dowel bars;

and selectively positioning said channels over a series of dowel bars in each row and assemblying the respective pipes over and upon at least some of said dowel bars of each row of dowel bars;

a plurality of said channels being arranged in a series of parallel spaced rows over said area with the safety guard dowel channels in each row being in alignment and longitudinally spaced;

the top surfaces of the series of assembled channels being coplaner forming a protective cover over said dowel bars.

2. In the method of claim 1, the dowel bars in each row of dowel bars being uniformly spaced apart;

and the pipes on each channel being spaced to receive some of said dowel bars, all underlying dowel bars being covered by the corresponding channel.

3. In the method of claim 1, there being a plurality of support pipes depending from each channel.

4. In the method of claim 2, said channels being selectively of different lengths, such as four feet, six feet, eight feet and ten feet.

5. In the method of claim 1, said dowel bars respectively extending the length of said pipes supportably engaging said channels.

6. In the method of claim 1, the channels overlying each row of dowel bars being selectively of the same and different lengths.

7. In the method of claim 1, the further step of securing the respective channels to said dowel bars.

8. In the pouring of concrete for building floors and walls having steel reinforcements over an area to be poured and a series of parallel spaced rows of longitudinally spaced upright dowel bars extending over said area;

a plurality of downwardly facing longitudinally spaced dowel guard channels overlying each row of dowel bars;

a plurality of longitudinally spaced aligned support pipes within each channel centrally thereof, at their upper ends secured thereto and with their lower ends depending below said channel and adapted to telescope over some of a corresponding series of spaced dowel bars, a plurality of said channels being arranged in a series of parallel spaced rows over said area with the channels in each row being in alignment and longitudinally spaced, the top surfaces of the series of assembled channels being co-planer forming a protective cover over said dowel bars.

9. In the dowel guard channel of claim 8, the dowel bars of each row of dowel bars being uniformly spaced apart, and the pipes of each channel being spaced to receive some of said dowel bars, all underlying dowel bars being covered by a corresponding channel.

10. In the safety dowel guard of claim 8, said channels being selectively of different lengths as four, six, eight and ten feet.

11. In the safety dowel guard of claim 8, said dowel bars respectively extending the length of said pipes supportably engaging said channels.

12. In the safety dowel guard of claim 8, the channels overlying each row of dowel bars being selectively of the same and different lengths.

13. In the safety dowel guard of claim 8, each pipe having a transverse aperture through its wall;
- a nut secured to each pipe respectively in registry with said aperture, and a bolt threaded through each nut extending through said aperture and operatively, frictionally and retainingly engaging a dowel bar.

* * * * *